United States Patent [19]

Ferris et al.

[11] 4,299,538
[45] Nov. 10, 1981

[54] CROSS BEAM ROTOR

[75] Inventors: Donald L. Ferris, Newtown; Peter C. Ogle, Woodbridge, both of Conn.

[73] Assignee: United Technologies Corporation, Hartford, Conn.

[21] Appl. No.: 966,925

[22] Filed: Dec. 6, 1978

[51] Int. Cl.³ .............................................. B64C 27/38
[52] U.S. Cl. .................................. 416/134 A; 416/141
[58] Field of Search ................ 416/134 A, 138 A, 141

[56] References Cited

U.S. PATENT DOCUMENTS

| | | | |
|---|---|---|---|
| 3,231,222 | 1/1966 | Scheutzow | 416/134 A X |
| 3,885,887 | 5/1975 | Desjardins | 416/141 |
| 4,053,258 | 10/1977 | Mouille | 416/134 A |
| 4,087,203 | 5/1978 | Ferris | 416/141 |
| 4,093,400 | 6/1978 | Rybicki | 416/134 A X |
| 4,104,003 | 8/1978 | Mouille | 416/134 A X |

FOREIGN PATENT DOCUMENTS 642206  7/1962  Italy ................................ 416/138 A Primary Examiner—Everette A. Powell, Jr.
Attorney, Agent, or Firm—Vernon F. Hauschild

[57] ABSTRACT

A helicopter rotor having an even number of articulated blades wherein opposing blades are interconnected by a common spar passing across the rotor axis. Pitch change is introduced to the blade at the spar-blade attachment joint through a torque member connected at its outboard end to the blade joint and including a control horn at its inner end to receive pitch inputs. Drive for the rotor and support for each blade is provided by a spherical bearing directly connecting the torque member to the blade associated hub arm.

11 Claims, 21 Drawing Figures

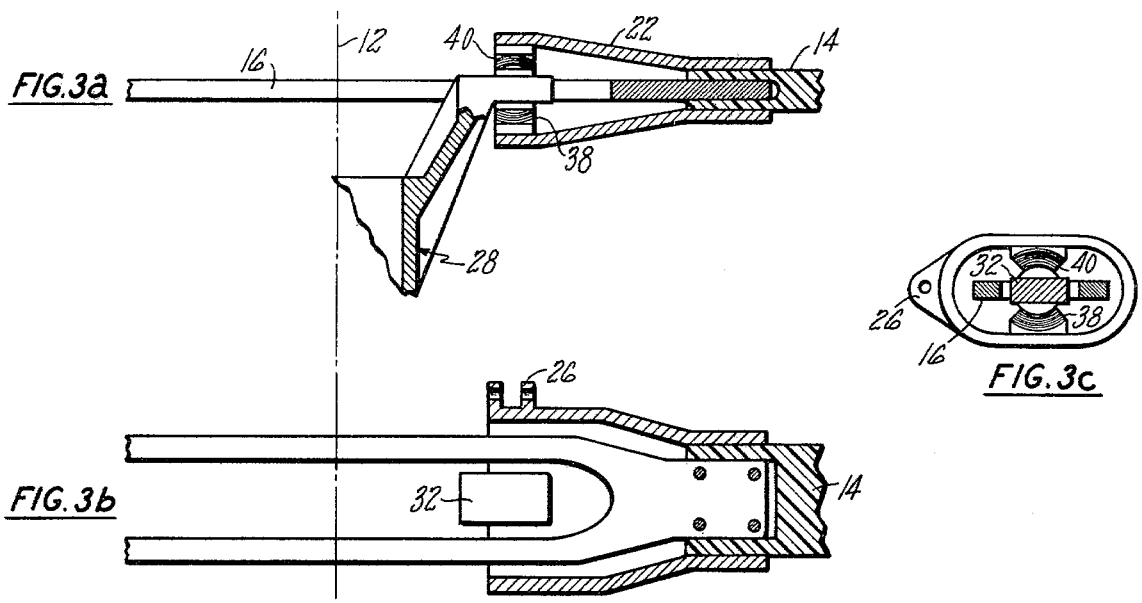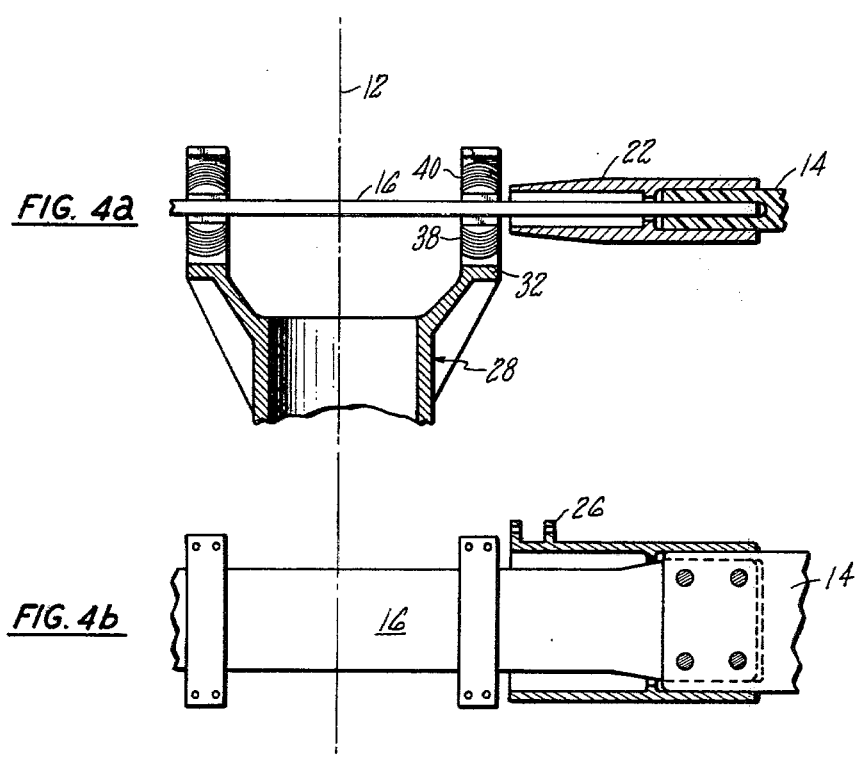

CROSS BEAM ROTOR

BACKGROUND OF THE INVENTION

1. Field of the Invention

This invention relates to helicopter rotors having an even number of blades wherein the opposed blades have a common member in the form of a flexible spar extending across the rotor axis. Such a rotor is identified herein as a cross-beam rotor. The spar is preferably fabricated of uni-directional, high tensile strength fibers bonded together and substantially rectangular in cross section. Improvements to the configuration of the spar cross section may result in a change to its shape, but are considered apart from the teaching of this invention, which can accommodate various shapes. The spar reacts the centrifugal load between opposite blades and may extend the full span of both blades to each tip, or may terminate at a blade attachment connection at a convenient radial station. The full tip-to-tip spar embodiment is generally limited to helicopter tail rotor applications, since a main rotor spar length equal to the rotor diameter would be too cumbersome to handle in the field as a single unit. The spar section is designed to provide the desired degree of stiffness in the in-plane and flapping directions for blade bending as well as torsional flexibility for blade pitch change motions. Pitch motions are introduced into the blade by twisting of the spar member. This invention recognizes the benefits of the prior art configurations that allow twisting and bending of the spar between bearing supports located on opposed sides of the rotor axis, and further improves such benefit by providing means for the spar to bend and twist over a further distance; that is, beyond the bearing supports to the radial attachment station where the spar-blade attachment joint is located. Thus, when spar bending and twisting occurs to its maximum degree, our improvement will result in smaller angular deflection of the spar and attendantly smaller stress levels. When used in a main rotor application, the blade radial station attachment joint is chosen so that the spar will have a long enough free length to accommodate all deflections at low stress and at the same time be short enough to allow a maximum length of the blade span to form the airfoil contour.

2. Description of the Prior Art

In its earliest form, the development efforts of the assignee of this application towards elimination of conventional rotor stack bearings in favor of a flexible cross-beam rotor took the form of the embodiment depicted in its Canadian Patent to Arcidiacono No. 951,301 filed Nov. 10, 1971 and issued July 16, 1974. In Arcidiacono, the flexible spar straps were sandwiched between two hub plates, and pitch inputs were introduced by means of a shell which attached to the flexible strap at a point approximately 30 percent of the rotor radius. Blade pitch control inputs twisted the strap inboard to the radial station where it was rigidly clamped by the hub members. The slotted hub plates into which the blade spar members are recessed provides means to impart drive between the drive shaft connected hub plates and the blades. The U.S. Pat. No. 3,484,174 to McCoubrey illustrates a second embodiment of a cross-beam rotor with a gimbaled flapping hinge. The connection of the flexible member to the hinge member provides for similar limited torsional deflection as in Arcidiacono, in that the spar portions are also rigidly clamped. Drive means is imparted from the drive shaft through a splined connection in the yoke assembly to an irregularly shaped insert and collar adapted to bear against the center portion of the spar in its spread apart relationship as it passes around the rotor axis.

The assignee's U.S. Pat. No. 3,874,820 to Fenaughty illustrates a further development in the field of this invention and is addressed principally to the angular relationship between the airfoil and supporting spar member. While the blade supporting structure is not shown, the structure utilized for flight aircraft comprised upper and lower clamp members which functioned similar to the structure shown in the Arcidiacono Patent. A still further development is presented in assignee's U.S. Pat. No. 4,008,980 to Hibyan and Noehren which shows the support structure referred to in the above reference to the Fenaughty patent. This structure is further described in the paper entitled: "Composite Bearingless Tail Rotor for UTTAS" dated May 1976 by R. Fenaughty and W. Noehren presented at the 32nd Annual National V/STOL Forum of the American Helicopter Society. The U.S. Pat. No. 3,874,815 to Baskin advanced the field of art by introducing flexible transverse pads in place of either the rigid clamps of Arcidiacono and others, or the metal gimbal bearings of McCoubrey. By means of the bearing pad or flexure member located transverse to the spar member, flexibility is provided to allow bending deflections caused by blade flapping to take place inboard of the radial position of the bearing pad; a feature not provided for theretofore. Similar to Arcidiacono, the spar members of Baskin are captured on their edges between bolted hub plates, the lower of which is connected to the drive shaft.

More recent U.S. Pat. No. 4,053,258 to Mouille further illustrates the known rigid clamping connection between the cross-over spar member and opposed hub plates.

The most significant and recent development in this field known to the applicants is the work of Rybicki as described in his U.S. Pat. No. 4,093,400, wherein his cross-beam spar is supported from the rotor hub arms by spherical elastomeric bearings, thus eliminating all need to twist the spar member when a cyclic path input is introduced. The advancing blade angle of attack is increased and the retreating blade angle of attack is reduced simply by tilting of the spar. This advantage is accomplished without sacrifice of the benefit of the advantage illustrated in Baskin; namely, the allowance of flap-wise spar bending across the rotor axis.

SUMMARY OF THE INVENTION

The present invention in general addresses the ever present design goal of providing an improvement to a known structure without compromising the significant benefits of that structure. As stated above, the Rybicki configuration allows flapwise bending to take place across the rotor axis between support bearings and thereby provides for lower blade stress, while eliminating cyclic pitch torsional stress. The McCoubrey structure includes the use of an elastomeric bearing or snubber located between the spar and the inner end of the torque tube or control horn. The snubber maintains the spaced relationship between the held spar and the otherwise movable pitch horn and thus prevents the introduction of pitch/flap coupling. These three beneficial characteristics of the prior art are maintained in the present invention while providing means to accommodate spar bending over a longer portion of its length for a blade of the same diameter and pitch offset. This improvement specifically allows spar bending to occur over the full spar length; that is, between the joints attaching opposed blade portions to the spar and torque member, whereas the prior art Rybicki configuration constrained the spar to the hub. This improved bending freedom is applicable in both bending planes. The concept which allows these characteristics and comprises our improvement is the attachment of the blade to the hub by bearing means located between the inboard end of the torque member and the associated hub arm. Such construction allows a great degree of unrestricted motion of the spar both in twisting and bending between the blade attachment joints and is not restricted by a support bearing. Since the inner end of the torque member, including its pitch control horn provision is held in position to the hub; undesired pitch coupling is avoided without the need for an additional snubber bearing.

It is one object of this invention to provide a rotor structure wherein the vertical motions of a flexible spar due to cyclic flapping and high and low coning are accommodated by bending of the spar across the rotor axis.

It is a second object of this invention to provide a rotor structure wherein the horizontal motions of a flexible blade spar due to lead and lag excursions incurred in normal flight as advancing and retreating blades lag and lead respectively or due to inertia effects of starting and stopping, are also accommodated by bending of the spar across the rotor axis.

It is a third object of this invention to provide a rotor structure wherein cyclic pitch inputs will not impose oscillatory torsional stresses.

It is a fourth object of this invention to provide a rotor structure including means for minimizing of pitch coupling.

It is a fifth object of this invention to provide a rotor structure including means to minimize steady static torsional blade stresses.

It is a final object of this invention to provide an integrated rotor structure meeting all of the heretofore mentioned objects while maintaining a short spar length and providing an improved bending capability by maximizing the effective spar length over which bending may take place.

Other objects and advantages of the present invention may be seen by referring to the following description and claims, read in conjunction with the accompanying drawings.

BRIEF DESCRIPTION OF THE DRAWINGS

FIGS. 3a, 3b, 3c are respectively side, plan, and end views of a two bladed rotor of the type illustrated in FIGS. 1 and 2.

FIGS. 4a and 4b are respectively side and plan views of the prior art type Rybicki rotor referred to as Ser. No. 751,006, illustrated in alignment with FIGS. 3a and 3b.

DESCRIPTION OF THE PREFERRED EMBODIMENT

Figure 1:
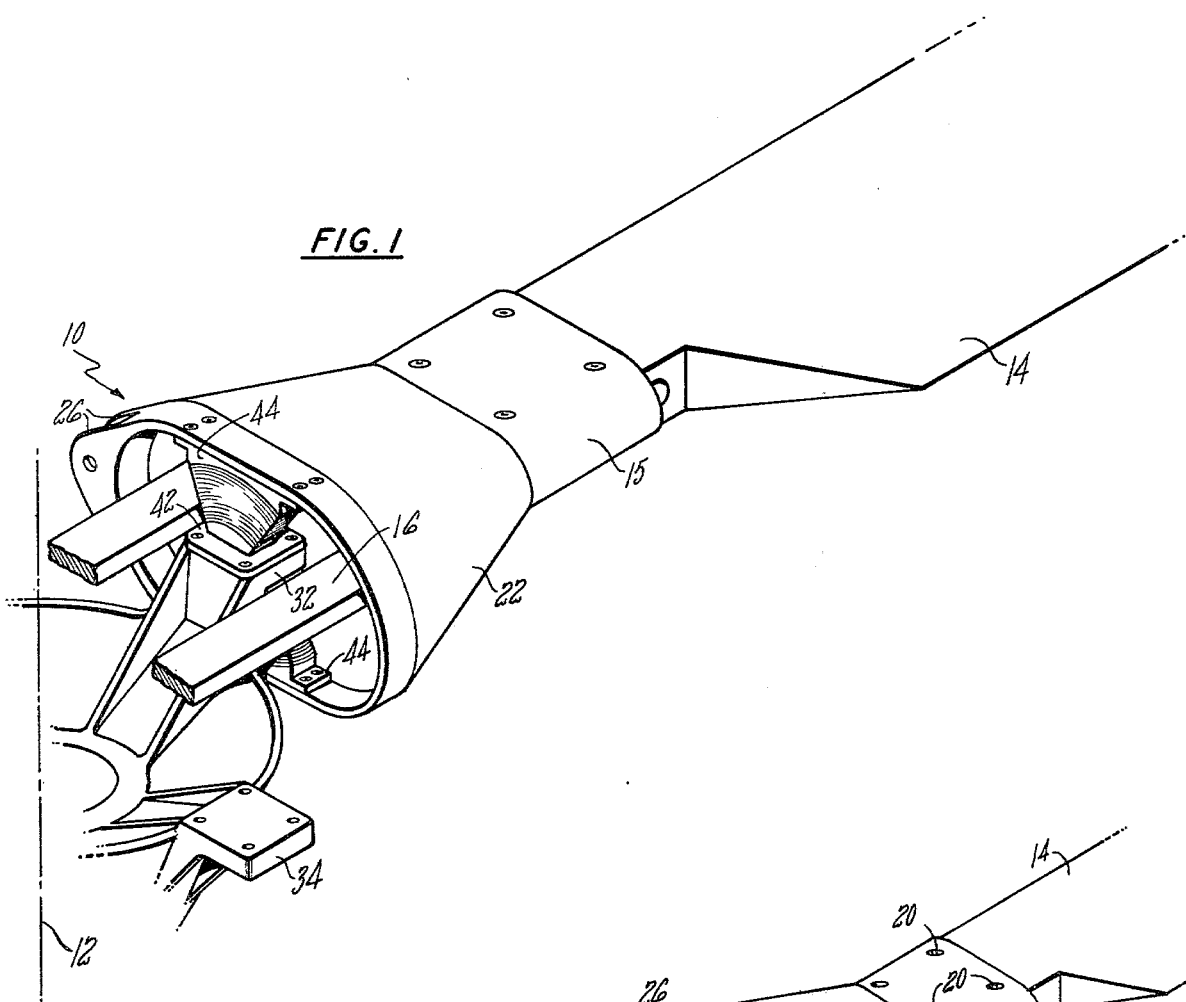
FIG. 1 is an isometric view of a four-bladed cross-beam helicopter rotor, shown in partial form for clarity.

Our invention is generally illustrated in FIG. 1 as a helicopter rotor head 10 having axis 12 and intended to rotate in a counter clockwise direction. An even number of rotor blades 14 (one shown only) extend in opposite directions in paired relationships. Each pair of blades is joined to a common flexible spar 16 to form a replaceable unit. When two or more pairs of blades are used in a rotor, the spars of each pair pass across the rotor axis in separate planes, with sufficient clearance space provided. The number of pairs of blades is not significant to this invention.

The type of blade radial station attachment joint 15 at which the end of spar 16 is attached to the airfoil portion of blade 14 is not significant to this invention except that it must be rigid. For a main rotor application it may be desirable that the joint 15 be detachable and utilize suitable bolts and bushings in the apertures 20 depicted in FIGS. 1 and 2. Also attached at the joint 15 is the outer end of a rigid torque member 22 having a pitch control horn 24 at its inner end. The shape of the torque member 22, spar 16 and the inner end of blade 14 are all generally elliptical or rectangular. The full airfoil contour of the blade extends from the joint 15 outboard to the tip. When used as a tail rotor with a diameter on the order of ten to twelve feet, the blade attachment joints 15 at opposite ends of the spar 16 may be permanently bonded, and the spar may extend radially outboard as far as may be desired for blade structural support reasons. Torque member 22 extends inboard from the blade/spar/torque member joint 15 in a generally increasing tapered form as it envelops spar 16, leaving clearance for twisting and bending of the spar within the confines of the torque member 22. The prior referenced Fenaughty U.S. Pat. No. 3,874,820 illustrates this construction. The tapered torque member terminates inboard to form the control horn 24, the leading edge of which forms a bifurcated attachment 26 for connecting conventional pitch change push rods (not shown).

All cyclic and collective pitch change demands for the rotor are introduced through the torque member 22 to the joint 15 at which the spar, torque member outer end, and blade proper are connected. The spar 16 is constructed to be flexible to accommodate in torsion all pitch change imposed angular deflections as well as to accommodate flatwise deflections. The torque member 22 is rigid, and hence is generally shaped as a closed member but may be of various shapes while allowing clearance freedom for blades and their respective crossing spars. The torque member may be formed of a truss configuration or open box design. Our preferred embodiment is a closed tube, which provides a streamlining function and minimum drag.

Figure 2:
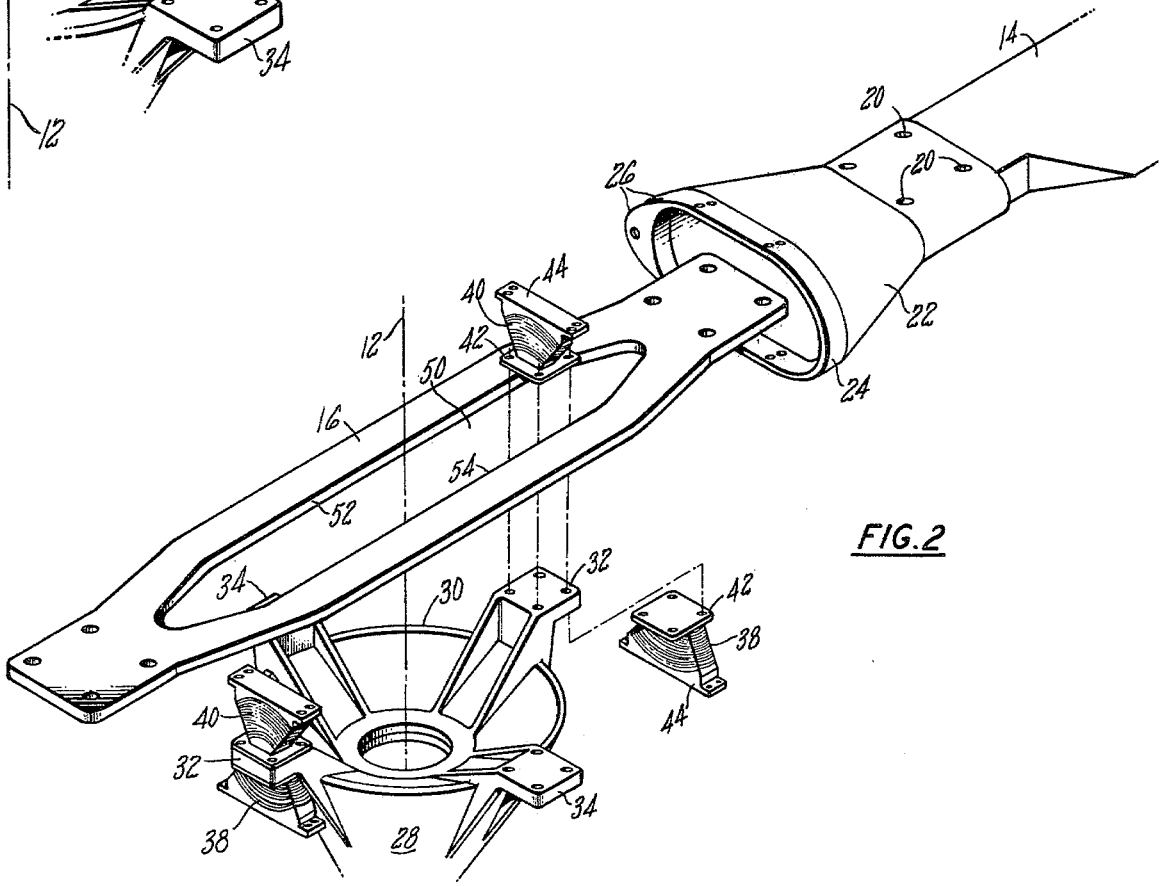
FIG. 2 is an isometric view of the same rotor as FIG. 1, but illustrated in an exploded fashion to produce a clearer and fuller showing of the cross-beam spar.

The rotor hub 28 includes a central portion 30, and in the FIGS. 1 and 2 embodiment includes one or more pairs of upstanding flat and opposed pads 32 and 34 for blade attachment. Paired pads 32 are located in a higher plane than paired pads 34. The key element of this invention which allows us to obtain all of the desired objectives is the concept of attaching each rotor hub arm to the inner end of the associated torque member, whereas the Rybicki reference and other similar structures have taught us to attach the hub directly to the flexible spar. Such attachment restrains the spar and prevents its bending over a large portion of its length between blade attachment joints. Our attachment means is by a set of lower and upper spherical shaped elastomeric bearings 38 and 40 positioned on opposite sides of the bearing pads 32 and 34 with their inner races 42 bolted together through pad 32 and 34 and their outer races 44 bolted to horn portion 24 of torque member 22. Bearings and blades associated with pads 34 are omitted from FIGS. 1 and 2. The use of a set of elastomeric spherical bearings mounted to the torque member is similar to the prior art such as U.S. Pat. No. 4,087,203, with the distinction that the spar 16 is not involved in such attachment nor is it a part of the rotor drive connection.

It should be understood that the importance of our teaching is the use of a bearing support between the hub arm 32 and the inner end of the torque member 22 rather than the specific number or configuration of bearings. Thus, when describing our embodiment, bearings 38 and 40 may be described as portions of a single bearing, or as a set of two separate units. When elastomeric bearings are used instead of full metal bearings, portions are required on each side of the hub arm to avoid tension loadings on the elastomer. In order to isolate the spar 16 as shown in FIGS. 1 and 2, a clearance passage 50 is provided for the pad 32 and associated lower and upper bearings 38 and 40 by forming the spar 16 into dual straps 52 and 54, where the spar passes the radial location of pad 32 and bearings 38 and 40. The passage 50 may be of selected shape and size depending on the spar stiffness requirements, envelope available for twist, material thickness, etc.

The bearing supports 38 and 40 and control horn 24 are each located at the point of maximum spar bending. Such common positioning tends to minimize pitch flap coupling. Numerous configurations can be designed as alternates to that embodiment shown in FIGS. 1 and 2, as will be described hereinafter in regard to FIGS. 9 and 10, but a common and necessary feature is the aforementioned direct connection of the hub 28 to the inner end of the torque member 22.

A more specific comparison between the structural aspects of our invention and the Rybicki structure (reference U.S. Pat. No. 4,093,400) is illustrated by FIGS. 3 and 4 respectively. FIGS. 3a, 3b, and 3c are partial showings of the same configuration illustrated in FIGS. 1 and 2, in rather schematic form showing one crossbeam spar only. FIGS. 4a and 4b of the Rybicki's patent are drawn in alignment with FIGS. 3a and 3b, and the rotor has the same pitch offset and spar length.

As described in regard to FIGS. 1 and 2, the FIGS. 3 and 4 configuration both use a cross-beam spar 16 joined at its outer ends to the outer portion of a torque member 22 and root end of the blade 14. Pitch inputs are introduced to the torque member inner end at attachment 26. Hub 28 has upwardly extending arms for rotor blade attachment. In our FIG. 3 configuration the attachment means comprise dual pads 32 for connecting lower and upper elastomeric bearings 38 and 40, which are connected by their outer races to the inner surface of horn 24 of the torque member 22. In the FIG. 4 Rybicki configuration the attachment means comprise similar attachment arms 32 for lower and upper elastomeric bearings 38 and 40, but such bearings are attached to the spar 16. In the FIG. 4 configuration, the upstanding hub pads 32 enclose the spar rather than pass through.

By comparison of the aligned FIGS. 3a and 4a one can visualize that both configurations provide for general freedom of movement (bending) of the spar across the rotor axis in cyclic flapping and high or low coning. Similarly, a comparison between FIGS. 3b and 4b reveals in-plane spar freedom across the rotor axis as the blades tend to lead and lag in either normal flight or during rotor starting or stopping. Thirdly, a comparison between the configurations reveals also that cyclic path inputs to the paired blades will cause the spars to tilt across the rotor axis, rather than twist as in embodiments where the spar is rigidly clamped to the rotor hub. Comparison also reveals that both spar members are free to twist across the rotor axis, and within the torque member, as a result of a collective pitch input. Twisting occurs between opposite blade radial station joints of opposed blades and over the entire length of the spars, rather than only radially inboard to the clamped spar station as in the earlier referenced clamped spar configurations. Qualitatively speaking, the bending and torsional freedoms for spar motions and deflections, all of which are beneficial from the aspect of providing low blade stresses, are the same in the FIGS. 3 and 4 configurations. However, it is in the degree of angular bending freedom for cyclic flapping and collective coning and for in-plane lead and lag that our invention constitutes an improvement when faced with the same diameter and offset. The improvement comprises the extending of spar bending flexibility such that all of the above stated bending freedoms take full advantage of the spar length between blade radial station joints. In contrast, the configuration represented by FIGS. 4a and 4b show that the spar is restricted, and is not free to translate vertically or horizontally due to the bearings mounted to the spar. Removal of such restriction for equivalent spar geometry allows a lowering of stress.

Figure 5A:
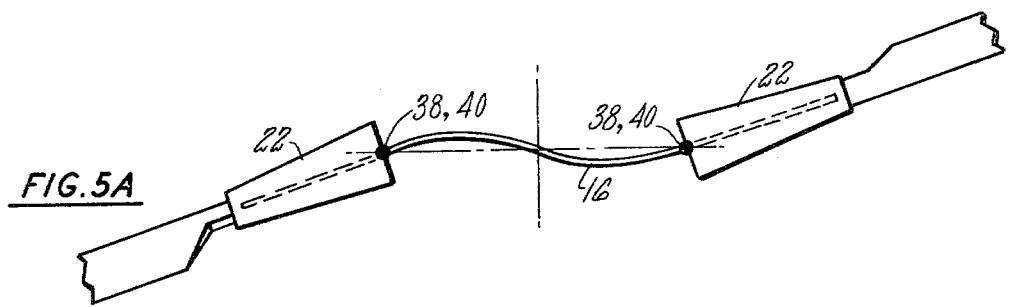
FIGS. 5a and 5b are side view schematic representations of the prior art Rybicki rotor and the rotor of our invention, illustrating the respective spars as they act in one bending mode.
Figure 5B:
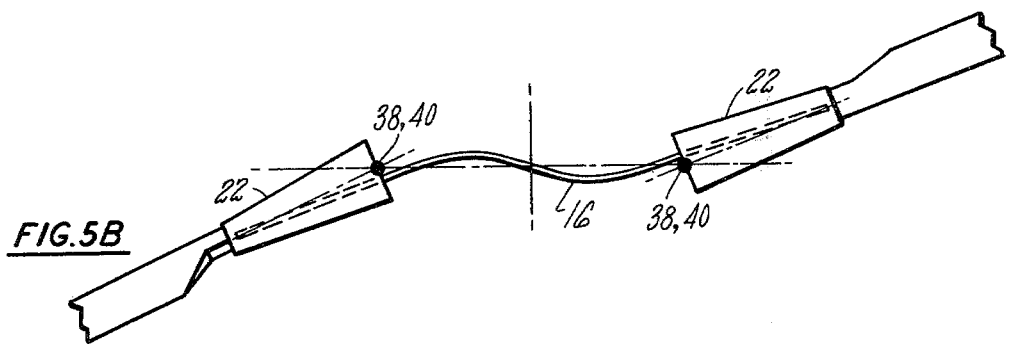
Figure 6A:
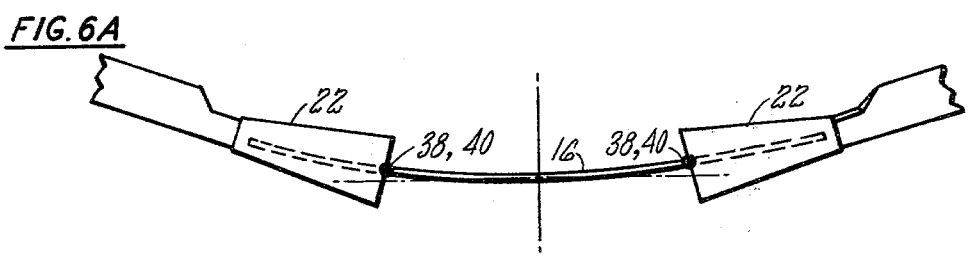
FIGS. 6a and 6b are side view showings similar to FIGS. 5a and 5b for the same respective rotors, illustrating a second bending mode.
Figure 6B:
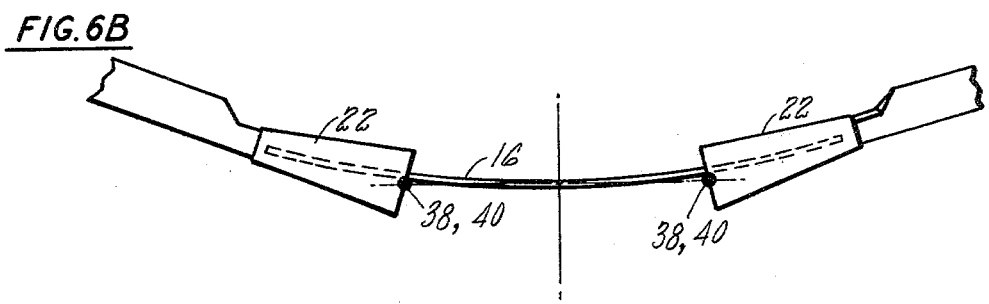
Figure 7B:
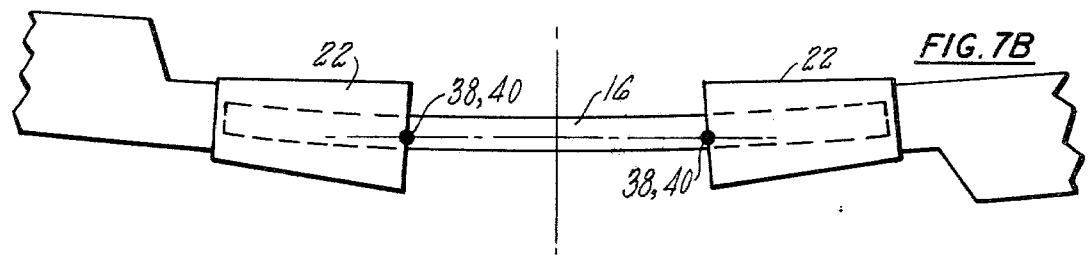
FIGS. 7a and 7b are top view showings similar to FIGS. 5a and 5b and 6a and 6b for the same respective rotors illustrating a third bending mode.
Figure 7A:
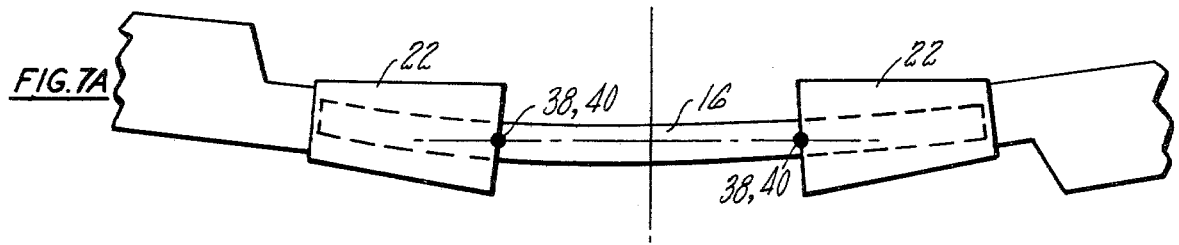
Figure 8B:
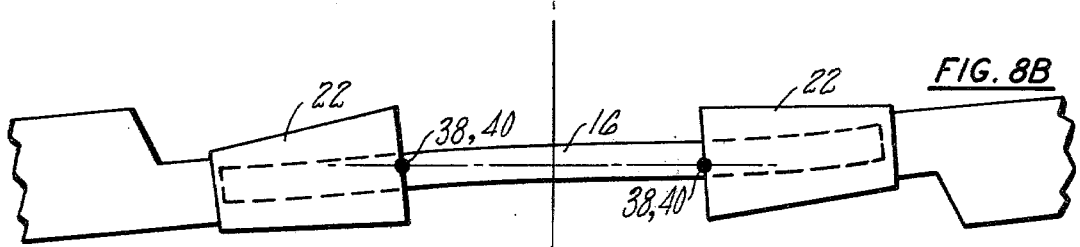
FIGS. 8a and 8b are top view showings similar to FIGS. 5a, 5b, 6a, 6b, 7a, and 7b for the same respective rotors illustrating a fourth bending mode.
Figure 8A:
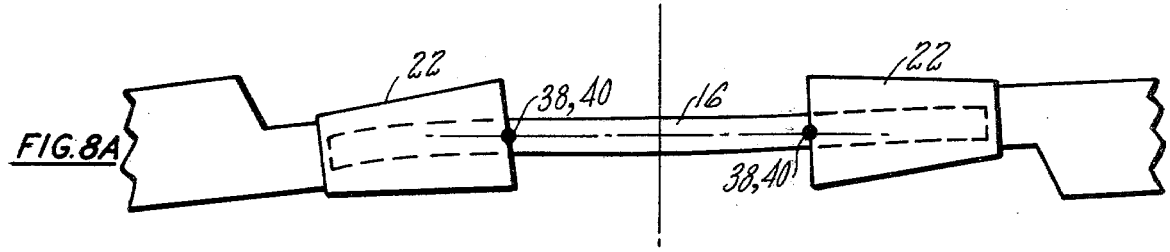

FIGS. 5 through 8 continue the comparison between the configurations presented as FIGS. 3 and 4, wherein the figures identified 5a, 6a, 7a, and 8a illustrate the angularity of spar bending for a specific blade angle under the respective actions of cyclic flapping, collective coning, lead/lag in normal flight, and lead/lag for starting or stopping of the Rybicki's patent illustrated in FIG. 4. The figures identified as 5b, 6b, 7b, and 8b illustrate our FIG. 3 configuration spar bending angularity for the same blade angle and under the same respective actions. The vertical blade flapping motions depicted in FIGS. 5 and 6, illustrate that for the same blade angularity to a horizontal plane in comparing FIGS. 5a to 5b as well as FIGS. 6a to 6b, the spar bending angles are less in the FIG. 5b and 6b showing, as a result of the freedom of the spar to move away vertically from the bearing location. Smaller bending angles means lower spar stresses. Horizontal blade and spar displacements due to blade hunting are depcited in FIGS. 7 and 8 for a two bladed counter-rotating rotor, and illustrate that for the same blade angularity of in-plane bending the spar bending angles are less in the FIGS. 7b, and 8b showings than for the FIGS. 7a and 7b respective showings. The reason is that the spar of our configuration is also free to be displaced horizontally from the support bearings. While the degree of in-plane bending is less than that of flatwise bending due to the geometry of the spar and its greater stiffness in the plane of the rotor disc, concern must still be expressed that stresses be minimized for a given geometry, weight, etc.

Figure 9A:
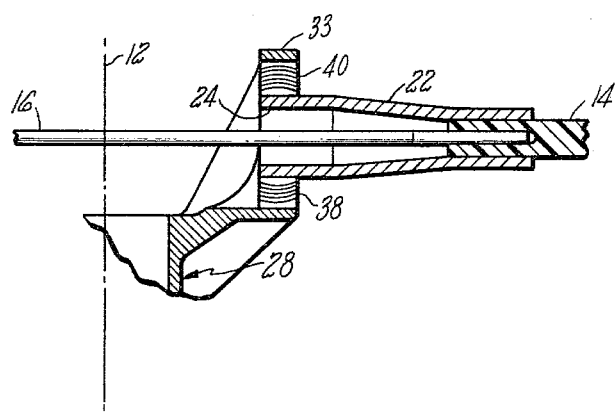
FIGS. 9a, 9b, 9c are respectively side, plan, and end views of a slightly modified configuration of the rotor illustrated in FIGS. 1, 2, 3a and 3b.
Figure 9B:
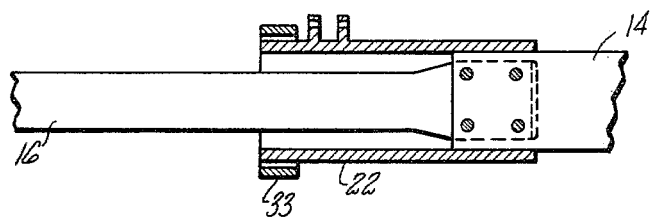
Figure 9C:
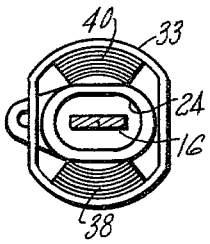
Figure 10A:
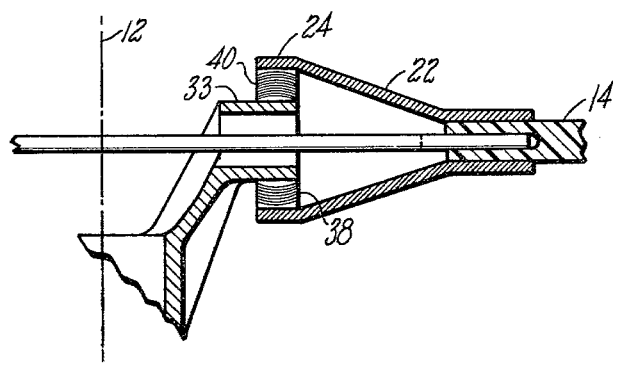
FIGS. 10a, 10b, and 10c are respectively side, plan, and end views of a second slightly modified configuration of the rotor illustrated in FIGS. 1, 2, 3a, and 3b.
Figure 10C:
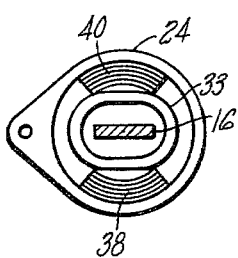
Figure 10B:
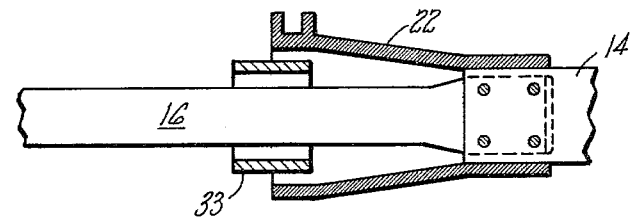

The groupings illustrated by FIGS. 9 and 10 present alternate embodiments to the preferred embodiment depicted as FIGS. 1, 2, and 3, serving to teach that direct attachment of the rotor hub 28 to the torque member 22 can be accomplished in varying configurations. FIGS. 9a, 9b, and 9c present views of one configuration where bearings 38 and 40 are located outside the torque member and have their inner races attached to the outer surfaces of horn 24 of the torque member 22. The outer races of bearings 38 and 40 are mounted to the inner surfaces of a fairly large flange 33 which may be formed integral with the hub 28 and functions similarly to the hub pad 32 of the preferred embodiment. Since the spar is enveloped by the flange 33, it is not necessary that a clearance aperture be made in the spar. The embodiment of FIGS. 10a, 10b, and 10c is similar to that of FIGS. 9a, 9b, and 9c in that the hub flange 33 envelopes the spar 16. The difference is that the bearings 38 and 40 are positioned with their inner races on the outer surface of flange 33 and their outer races on the inner surface of the horn 24 of torque member 22.

In the prior art configuration of cross-beam rotors having their flexible spars mounted rigidly to the rotor hub, the need has been present to incorporate snubber type bearings between the spar and the inner end of a torque tube to avoid pitch coupling effects, as an otherwise unrestrained torque tube could shift its position as a result of spar flexing. With the inner end of the torque member restrained as taught in this invention, such pitch coupling is precluded. In the cross-beam configurations shown throughout FIGS. 1 through 4, 9 and 10, it should be understood that elastomeric bearings, consisting generally of assemblies of thin metal and elastomer laminates in alternating sandwich form are used throughout. The capability of these bearings to allow axial as well as rotary motion is used to advantage in allowing a flexible spar to be used within a rigid torque tube. The slight foreshortening of the spar that takes place relative to the fixed length torque member is accommodated by the axial motion capability of the elastomeric bearing. Metal bearings can be used in these applications if desired, providing they are configured to allow the same degree of axial freedom. A single metal bearing can be substituted for the elastomeric bearings 38 and 40 illustrated herein. Other flexible means of support may also be used within the overall teaching of this invention which provide the same function as the elastomeric bearing.

We wish it to be understood that we do not desire to be limited to the exact details of construction shown and described, for obvious modifications will occur to a person skilled in the art.

We claim:

1. A helicopter rotor having one or more pairs of opposed blades, each pair connected by a common spar, said spar being flexible in torsion and bending, a rotor hub, a rigid blade attachment joint formed between said spar and each associated blade, a rigid torque member mounted at said blade attachment joint, said member extending radially inward from said joint, pitch change connecting means provided at the inner ends of said member, each blade supported by a bearing, one race of said bearing attached to said hub and the other race attached to the torque member of said blade, said blade support allowing unrestricted spar torsional and bending freedom between opposite blade attachment joints.

2. A rotor according to claim 1 wherein said torque member is formed as a substantially elliptical tube wherein clearance is provided for the enclosed spar.

3. A rotor according to claim 1 wherein means associated with said bearing provide relative rotational and axial motion freedom between said spar and torque member.

4. A rotor according to claim 1 wherein said bearing is spherical shaped and comprises alternating layers of metal laminates and elastomer.

5. A rotor according to claim 1 wherein said spar is bifurcated and said bearing connected between the torque member and hub passes between its branches.

6. A rotor according to claim 5 wherein said hub includes two upstanding arms to which the inner race of said bearing is attached, and which arms lie substantially in the plane of the spar.

7. A rotor according to claim 1 wherein the pitch change connecting means and blade support bearing are radially offset from the rotor axis substantially the same distance.

8. A rotor according to claim 6 wherein said upstanding hub arms include a central clearance passage through which said spar passes.

9. A rotor according to claim 6 wherein the bearing is formed of two halves through its inner race, each half connected on opposite sides of the hub arm.

10. A helicopter rotor having a pair of opposed blades connected together by a common spar, said spar being flexible in torsion and bending, a rigid attachment joint formed between said spar and each associated blade, a rigid torque member mounted at said blade attachment joint, said torque member extending radially inward from said joint, pitch change connecting means provided at the inner ends of said torque member, a rotor hub, blade support means allowing unrestricted spar torsional and bending freedom between opposite blade attachment joints, such support means comprising a bearing, one race of said bearing attached to said hub and the other race attached to the torque member of said blade.

11. A rotor according to claim 10 wherein said bearing provides the sole and only support of said blade from said hub.

* * * * *